(12) United States Patent
Lee et al.

(10) Patent No.: US 12,019,254 B2
(45) Date of Patent: Jun. 25, 2024

(54) ELECTRONIC DEVICE INCLUDING OPTICAL SENSING ELEMENT

(71) Applicant: InnoLux Corporation, Miao-Li County (TW)

(72) Inventors: Te-Yu Lee, Miao-Li County (TW); Yu-Tsung Liu, Miao-Li County (TW); Wei-Ju Liao, Miao-Li County (TW); Po-Hsin Lin, Miao-Li County (TW); Chao-Yin Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/147,078

(22) Filed: Dec. 28, 2022

(65) Prior Publication Data

US 2023/0236342 A1    Jul. 27, 2023

(30) Foreign Application Priority Data

Jan. 26, 2022    (CN) .......................... 202210093016.6

(51) Int. Cl.
*G06V 40/13* (2022.01)
*G02B 5/00* (2006.01)

(52) U.S. Cl.
CPC ......... *G02B 5/005* (2013.01); *G06V 40/1318* (2022.01)

(58) Field of Classification Search
CPC .............................. G02B 5/005; G06V 40/1318
See application file for complete search history.

(56) References Cited

U.S. PATENT DOCUMENTS

| 2019/0228204 | A1* | 7/2019 | Park ................... G06V 40/1335 |
| 2021/0133423 | A1  | 5/2021 | Zhang et al. |
| 2022/0301337 | A1  | 9/2022 | Huang et al. |

FOREIGN PATENT DOCUMENTS

| CN | 111095286 A | 5/2020 |
| CN | 111801679 A | * 10/2020 ........... G06K 9/0004 |
| TW | M567414 U | 9/2018 |
| TW | M602226 U | 10/2020 |
| TW | I748851 B | 12/2021 |

OTHER PUBLICATIONS

Chinese language office action dated May 16, 2023, issued in application No. TW 111136333.

* cited by examiner

*Primary Examiner* — Stephen G Sherman
(74) *Attorney, Agent, or Firm* — McClure, Qualey & Rodack, LLP

(57) ABSTRACT

An electronic device is provided. The electronic device includes a substrate, an optical sensing element, a light-shielding structure, and a microlens. The substrate has a normal direction. The optical sensing element is disposed on the substrate. The light-shielding structure is disposed on the optical sensing element and includes a plurality of light-shielding layers. Each light-shielding layer includes an opening, and centers of the openings are arranged along a first direction and separated from each other. The microlens is disposed on the light-shielding layers and overlaps the opening of the uppermost light-shielding layer. The microlens guides light into an optical channel formed by the openings, so that the optical sensing element has a maximum response value for light with an incident angle that is greater than or equal to 10 degrees and less than or equal to 30 degrees relative to the normal direction.

18 Claims, 6 Drawing Sheets

ELECTRONIC DEVICE INCLUDING OPTICAL SENSING ELEMENT

CROSS REFERENCE TO RELATED APPLICATIONS

This application claims the benefit of China Application No. 202210093016.6, filed Jan. 26, 2022, the entirety of which is incorporated by reference herein.

BACKGROUND

Technical Field

The present disclosure is related to an electronic device, and in particular it is related to an electronic device having a sensing element.

Description of the Related Art

Optical sensing devices are widely used in consumer electronics such as smartphones and wearable devices, which have become indispensable necessities in modern society. With the rapid development of these consumer electronics, consumers have high expectations on the quality, functionality, or price of these products.

An optical fingerprint sensing device receives light reflected by the fingerprint and analyzes the image signal, so as to achieve the function of fingerprint recognition and determination. However, when an optical fingerprint sensing device receives a reflected fingerprint signal under strong light (e.g., sunlight), excessive exposure of the image signal of the optical fingerprint sensing device may occur due to the strong background light, and the fingerprint cannot be accurately recognized and determined.

In order to improve the performance of the optical sensing device, the development of a structural design that can reduce the interference caused by the environment to the signal of the sensing device is one of the current research topics in the industry.

SUMMARY

In accordance with some embodiments of the present disclosure, an electronic device is provided. The electronic device includes a substrate, an optical sensing element, a light-shielding structure, and a microlens. The substrate has a normal direction. The optical sensing element is disposed on the substrate. The light-shielding structure is disposed on the optical sensing element and includes a plurality of light-shielding layers. Each light-shielding layer includes an opening, and centers of the openings are arranged along a first direction and separated from each other. The microlens is disposed on the light-shielding layers and overlaps the opening of the uppermost light-shielding layer. The microlens guides light into an optical channel formed by the openings, so that the optical sensing element has a maximum response value for light with an incident angle that is greater than or equal to 10 degrees and less than or equal to 30 degrees relative to the normal direction.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
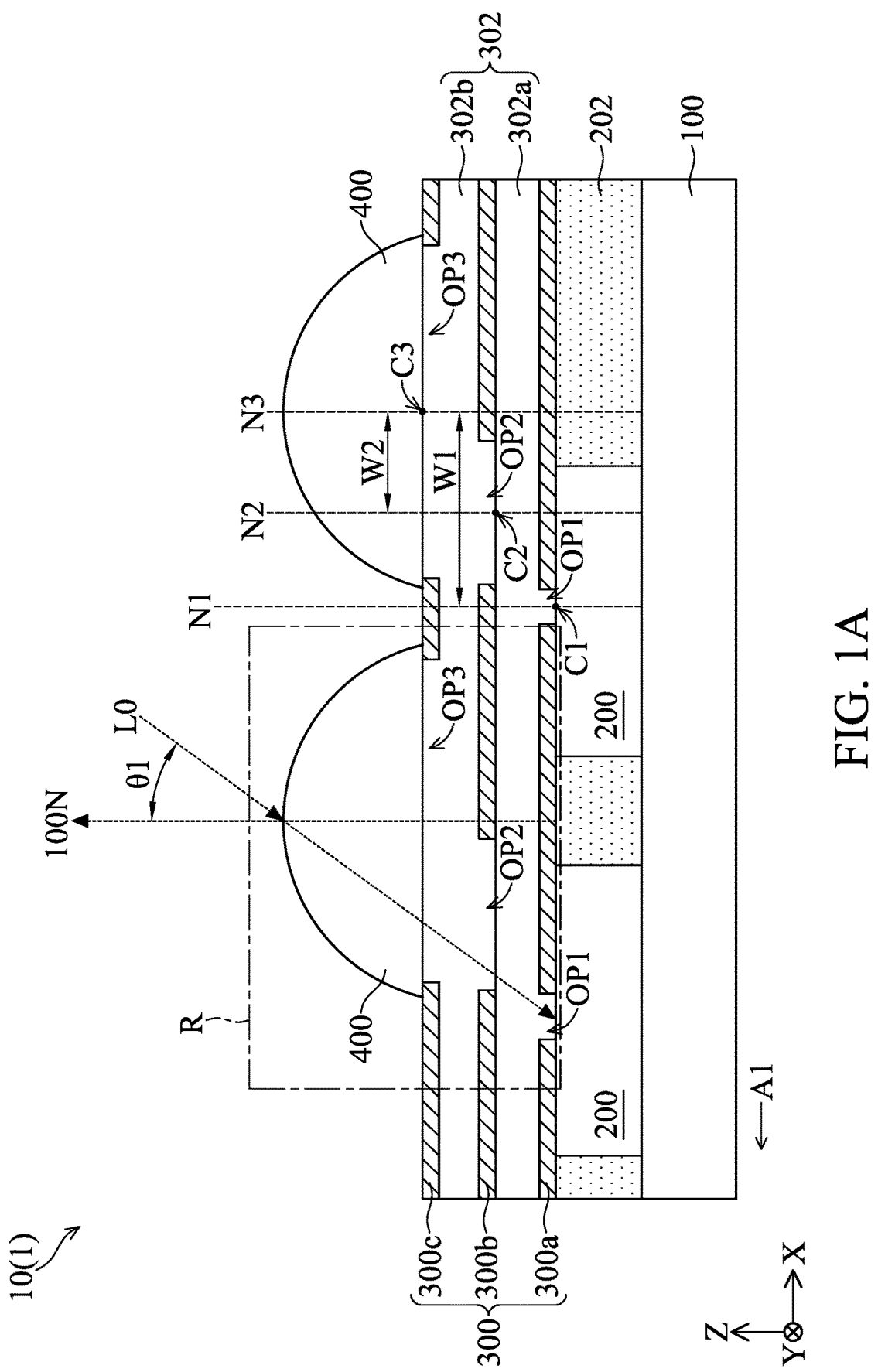
FIG. 1A is a partial cross-sectional diagram of an electronic device in accordance with some embodiments of the present disclosure.

The electronic device according to the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. These embodiments are used merely for the purpose of illustration, and the present disclosure is not limited thereto. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

It should be understood that relative expressions may be used in the embodiments. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. The drawings are also regarded as part of the description of the present disclosure. It should be understood that the drawings of the present disclosure may be not drawn to scale. In fact, the size of the elements may be arbitrarily enlarged or reduced to clearly represent the features of the present disclosure.

Furthermore, the expression "a first material layer is disposed on or over a second material layer" may indicate that the first material layer is in direct contact with the second material layer, or it may indicate that the first material layer is in indirect contact with the second material layer. In the situation where the first material layer is in indirect contact with the second material layer, there may be one or more intermediate layers between the first material layer and the second material layer. However, the expression "the first material layer is directly disposed on or over the second material layer" means that the first material layer is in direct contact with the second material layer, and there is no intermediate element or layer between the first material layer and the second material layer.

Moreover, it should be understood that the ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is to make an element with a certain name can be clearly distinguished from another element with the same name. Claims and the specification may not use the same terms. For example, the first element in the specification may refer to the second element in the claims.

In accordance with the embodiments of the present disclosure, regarding the terms such as "connected to", "interconnected with", etc. referring to bonding and connection, unless specifically defined, these terms mean that two structures are in direct contact or two structures are not in direct contact, and other structures are provided to be disposed between the two structures. The terms for bonding and connecting may also include the case where both structures are movable or both structures are fixed. In addition, the term "electrically connected to" or "electrically coupled to" may include any direct or indirect electrical connection means.

In the following descriptions, terms "about" and "substantially" typically mean +/−10% of the stated value, or typically +/−5% of the stated value, or typically +/−3% of the stated value, or typically +/−2% of the stated value, or typically +/−1% of the stated value or typically +/−0.5% of the stated value. The expression "in a range from the first value to the second value" or "between the first value and the second value" means that the range includes the first value, the second value, and other values in between.

It should be understood that in the following embodiments, without departing from the spirit of the present disclosure, the features in several different embodiments can be replaced, recombined, and mixed to complete another embodiment. The features between the various embodiments can be mixed and matched arbitrarily as long as they do not violate or conflict the spirit of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with the embodiments of the present disclosure, an electronic device is provided. The electronic device includes an optical sensing element, a light-shielding structure, and a microlens configured in a specific manner, so that the optical sensing element has a maximum response value for oblique incident light within a specific angle range, thereby reducing the interference of ambient light on the signal interpretation of the electronic device. Therefore, the sensing performance of the electronic device can be improved. For example, in the situation where the electronic device is used in an environment with strong light (e.g., sunlight), the adverse effects of image signal overexposure and reduced sensing sensitivity caused by the electronic device receiving a large amount of ambient light can be reduced.

Refer to FIG. 1A, which is a partial cross-sectional diagram of an electronic device 1 in accordance with some embodiments of the present disclosure. Specifically, FIG. 1A is a structural diagram of an sensing structure 10 of the electronic device 1. It should be understood that some elements of the electronic device 1 are omitted in the figures for clarity, and only some elements are schematically shown. In accordance with some embodiments, additional features may be added to the electronic device 1. In accordance with some other embodiments, some features of the electronic device 1 described below may be replaced or omitted.

As shown in FIG. 1A, in accordance with some embodiments, the electronic device 1 (sensing structure 10) may include a substrate 100, an optical sensing element 200, a light-shielding structure 300 and a microlens 400. The optical sensing element 200 may be disposed on the substrate 100. The light-shielding structure 300 may be disposed on the optical sensing element 200. The microlens 400 may be disposed on the light-shielding structure 300.

The substrate 100 may include a flexible substrate, a rigid substrate, or a combination thereof, but it is not limited thereto. In accordance with some embodiments, the material of the substrate 100 may include glass, quartz, sapphire, ceramic, polyimide (PI), polycarbonate (PC), polyethylene terephthalate (PET), polypropylene (PP), another suitable material, or a combination thereof, but it is not limited thereto. Moreover, in accordance with some embodiments, the substrate 100 may include a metal-glass fiber composite sheet, or a metal-ceramic composite sheet, but it is not limited thereto. In addition, the light transmittance of the substrate 100 is not limited. That is, the substrate 100 may be a transparent substrate, a semi-transparent substrate or a non-transparent substrate.

The optical sensing element 200 can receive light and convert it into an electrical signal. In accordance with some embodiments, the optical sensing element 200 may include a photodiode, another element capable of converting optical and electrical signals, or a combination thereof, but it is not limited thereto.

Specifically, in accordance with some embodiments, the optical sensing element 200 may be formed of a semiconductor material. For example, the semiconductor material may include silicon, germanium, indium gallium arsenide (InGaAs), and another suitable semiconductor material, or a combination thereof. Furthermore, the semiconductor material may be doped to have different conductive properties. For example, in accordance with some embodiments, the optical sensing element 200 may have a P-N structure, a P-I-N structure, an N-I-P structure, or another suitable structure, but it is not limited thereto.

In addition, the optical sensing element 200 may be electrically connected to a driving layer (not illustrated) disposed on the substrate 100. In accordance with some embodiments, the driving layer may include thin-film transistors, and the driving layer may include conductive elements and signal lines electrically connected to the thin-film transistors, insulating layers formed between the conductive elements, and planarization layers, etc.

In accordance with some embodiments, the thin-film transistor may include a switching transistor, a driving transistor, a reset transistor, a transistor amplifier, or another suitable thin-film transistor. According to different embodiments, the electronic device 1 may have any suitable number or type of thin-film transistors. Furthermore, the types of thin-film transistor may include a top gate thin-film transistor, a bottom gate thin-film transistor, a dual gate or double gate thin-film transistor, or a combination thereof. In accordance with some embodiments, the thin-film transistor may be further electrically connected to the capacitor element, but it is not limited thereto.

In accordance with some embodiments, the signal lines may include, for example, current signal lines, voltage signal lines, high-frequency signal lines, and low-frequency signal lines, and the signal lines may transmit device operating voltage (VDD), common ground voltage (VSS), or the voltage of driving device terminal, but the present disclosure is not limited thereto.

As shown in FIG. 1A, in accordance with some embodiments, the optical sensing element 200 may be disposed adjacent to a planarization layer 202. In accordance with some embodiments, the electronic device 1 may include a plurality of optical sensing elements 200, and the planarization layer 202 may be disposed between adjacent optical sensing elements 200.

In accordance with some embodiments, the material of the planarization layer 202 may include an organic material, an inorganic material, another suitable material, or a combination thereof, but it is not limited thereto. For example, the inorganic material may include, but is not limited to, silicon nitride, silicon oxide, silicon oxynitride, aluminum oxide, another suitable material, or a combination thereof. For example, the organic material may include, but is not limited to, epoxy resins, silicone resins, acrylic resins (e.g., polymethylmethacrylate (PMMA)), polyimide, perfluoroalkoxy alkane (PFA), another suitable material or a combination thereof.

In accordance with some embodiments, the planarization layer 202 may be formed by a chemical vapor deposition process, a physical vapor deposition process, a coating process, a printing process, another suitable process, or a combination thereof. For example, the chemical vapor deposition process may include a low-pressure chemical vapor deposition (LPCVD) process, a low-temperature chemical vapor deposition (LTCVD) process, a rapid thermal chemical vapor deposition (RTCVD) process, a plasma enhanced chemical vapor deposition (PECVD) process or an atomic layer deposition (ALD) process, etc., but it is not limited thereto. For example, the physical vapor deposition process may include a sputtering process, an evaporation process, or a pulsed laser deposition, etc., but it is not limited thereto.

Furthermore, the light-shielding structure 300 may include a plurality of light-shielding layers, each light-shielding layer may have an opening, and the centers of the openings may be arranged along a first direction A1 (for example, a direction parallel to the X direction in the drawing) and separated from each other. For example, as shown in FIG. 1A, the light-shielding structure 300 may include, but is not limited to, a first light-shielding layer 300a, a second light-shielding layer 300b, and a third light-shielding layer 300c. The second light-shielding layer 300b may be disposed on the first light-shielding layer 300a. The third light-shielding layer 300c may be disposed on the second light-shielding layer 300b. The first light-shielding layer 300a may include a first opening OP1. The second light-shielding layer 300b may include a second opening OP2. The third light-shielding layer 300c may include a third opening OP3. In addition, a center C1 of the first opening, a center C2 of the second opening OP2, and a center C3 of the third opening OP3 may be arranged along the first direction A1 and separated from each other. In other words, the center C1 of the first opening OP1, the center C2 of the second opening OP2, and the center C3 of the third opening OP3 do not overlap each other. In accordance with some embodiments, in a normal direction 100N of the substrate 100 (e.g., the Z direction in the drawing), the first opening OP1 does not overlap the second opening OP2. In accordance with some embodiments, in the normal direction 100N of the substrate 100, the first opening OP1 does not overlap the third opening OP3. In addition, it should be noted that the structure shown in FIG. 1A is merely an exemplary embodiment. In accordance with some embodiments, the third light-shielding layer 300c may not exist, so that the first light-shielding layer 300a and the second light-shielding layer 300b exist between the microlens 400 and the optical sensing element 200. In accordance with some embodiments, the light-shielding layers between the microlens 400 and the optical sensing element 200 may exceed three layers, for example, four or five light-shielding layers.

The light-shielding structure 300 can reduce the reflectivity of light, and has the effect of anti-reflection or reducing the signal-to-noise ratio (SNR). It is worth noting that the positions of the first opening OP1 of the first light-shielding layer 300a, the second opening OP2 of the second light-shielding layer 300b, and the third opening OP3 of the third light-shielding layer 300c are shifted, so that the incident light in a specific angle range can pass through the first opening OP1, the second opening OP2 and the third opening OP3 to reach the optical sensing element 200.

Specifically, in accordance with some embodiments, the center C1 of the first opening OP1 and the center C3 of the third opening OP3 may be separated from each other by a distance W1, and the distance W1 may be greater than or equal to 4 micrometers (μm) and less than or equal to 8 micrometers (4 micrometers≤W1≤8 micrometers), for example, 4.5 micrometers, 5 micrometers, 5.5 micrometers, 6 micrometers, 6.5 micrometers, 7 micrometers or 7.5 micrometers, but it is not limited thereto. Specifically, the distance W1 refers to the minimum distance between an extension line N1 passing through the center C1 and an extension line N3 passing through the center C3, and both the extension line N1 and the extension line N3 are parallel to the normal direction 100N of the substrate 100 (e.g., the Z direction in the drawing).

Moreover, in accordance with some embodiments, the center C2 of the second opening OP2 and the center C3 of the third opening OP3 may be separated from each other by a distance W2, and the distance W2 may be greater than 0 micrometers and less than or equal to 6 micrometers (0 micrometers≤W1≤6 micrometers), for example, 2 micrometers, 2.5 micrometers, 3 micrometers, 3.5 micrometers, 4 micrometers, 4.5 micrometers, 5 micrometers, or 5.5 micrometers, but it is not limited thereto. Specifically, the distance W2 refers to the minimum distance between an extension line N2 passing through the center C2 and the extension line N3 passing through the center C3, and both the extension line N2 and the extension line N3 are parallel to the normal direction 100N of the substrate 100 (e.g., the Z direction in the drawing).

In addition, the aforementioned center C1, center C2 and center C3 respectively refer to the geometric centers the first opening OP, the second opening OP2 and the third opening OP3 in the top-view diagram of the electronic device 1 (for example, the X-Y plane in the drawing). For example, if the opening is circular, the center of the opening can be the center of the circle. If the opening is shaped like a rectangle or square, the center can be the intersection of two diagonals. If the opening is irregular and the center cannot be defined by the aforementioned method, the smallest circle that can surround the opening can be drawn, and the center of the smallest circle is defined as the center of the opening, but the present disclosure is not limited thereto. For example, in accordance with some embodiments, in the light-shielding layer closest to the microlens 400 (e.g., the third light-shielding layer 300c in FIG. 1A), the geometric center of the microlens 400 in the top-view diagram is used as the center of the opening in the light-shielding layer. In accordance with some embodiments, a scanning electron microscope (SEM) can be used to obtain any cross-sectional image including the three openings OP1, OP2 and OP3 at the same time, and the middle points of each opening in the image can be used as the center points of the openings for measurement.

It should be understood that, in accordance with the embodiments of the present disclosure, in addition to a scanning electron microscope, an optical microscope (OM), a film thickness profiler (α-step), an ellipsometer or another suitable method may be used to measure the spacing or distance between elements, or the width, thickness or height of each element. Specifically, in accordance with some embodiments, a scanning electron microscope may be used to obtain a cross-sectional image including the elements to be measured, and the spacing or distance between elements, or the width, thickness or height of each element in the image can be measured.

In accordance with some embodiments, the first light-shielding layer 300a, the second light-shielding layer 300b, and the third light-shielding layer 300c may include an organic material or a metal material. The organic material may include black resin. The metal material may include copper (Cu), aluminum (Al), molybdenum (Mo), indium (In), ruthenium (Ru), tin (Sn), gold (Au), platinum (Pt), zinc (Zn), silver (Ag), titanium (Ti), lead (Pb), nickel (Ni), chromium (Cr), magnesium (Mg), palladium (Pd), alloys of the foregoing materials, another suitable metal material, or a combination thereof, but it is not limited thereto. Furthermore, the materials of the first light-shielding layer 300a, the second light-shielding layer 300b, and the third light-shielding layer 300c may be the same as each other, different from each other, or partially different.

In accordance with some embodiments, the first light-shielding layer 300a, the second light-shielding layer 300b and the third light-shielding layer 300c may be formed by a chemical vapor deposition process, a physical vapor deposition process, an electroplating process, an electroless plating process, another suitable process, or a combination thereof. In addition, the first light-shielding layer 300a, the second light-shielding layer 300b and the third light-shielding layer 300c may be patterned by one or more photolithography processes and/or etching processes to form the first opening OP1, the second opening OP2 and the third opening OP3, respectively.

In addition, as shown in FIG. 1A, in accordance with some embodiments, the electronic device 1 may further include a dielectric structure 302 disposed on the optical sensing element 200, and the dielectric structure 302 may be disposed between the first light-shielding layer 300a and the second light-shielding layer 300b, and between the second light-shielding layer 300b and the third light-shielding layer 300c. Specifically, in accordance with some embodiments, the dielectric structure 302 may include a first dielectric layer 302a and a second dielectric layer 302b. The first dielectric layer 302a may be disposed between the first light-shielding layer 300a and the second light-shielding layer 300b and filled in the first opening OP1. The second dielectric layer 302b may be disposed between the second light-shielding layer 300b and the third light-shielding layer 300c and filled in the second opening OP2 and the third opening OP3. In accordance with some other embodiments, the second dielectric layer 302b may be disposed between the second light-shielding layer 300b and the third light-shielding layer 300c, and only filled in the second opening OP2, and a portion of the microlens 400 may be filled in the third opening OP3.

The materials of the first dielectric layer 302a and the second dielectric layer 302b may be transparent materials. In accordance with some embodiments, the materials of the first dielectric layer 302a and the second dielectric layer 302b may include organic dielectric materials or inorganic dielectric materials. For example, the organic dielectric material may include perfluoroalkoxy alkane (PFA), polytetrafluoroethylene (PTFE), fluorinated ethylene propylene (FEP), polyethylene, another suitable material, or a combination thereof, but it is not limited thereto. For example, the inorganic dielectric material may include silicon oxide, silicon nitride, silicon oxynitride, or a combination thereof, but it is not limited thereto. Furthermore, the material of the first dielectric layer 302a may be the same as or different from the material of the second dielectric layer 302b.

In accordance with some embodiments, the first dielectric layer 302a and the second dielectric layer 302b may be formed by a coating process, a chemical vapor deposition process, a physical vapor deposition process, a printing process, an evaporation process, a sputtering process, another suitable process, or a combination thereof.

Furthermore, it should be understood that, although the electronic device 1 shown in the drawing has two dielectric layers, according to different embodiments, the number of the dielectric layers can be adjusted according to need, and the present disclosure is not limited thereto.

In addition, referring to FIG. 1A, the micro-lens 400 may overlap the uppermost layer of the light-shielding structure 300; that is, it may overlap the third opening OP3 of the third light-shielding layer 300c. Specifically, in the normal direction 100N of the substrate 100 (e.g., the Z direction in the drawing), the microlens 400 may overlap the opening OP3. In accordance with some embodiments, the geometric center (not illustrated) of the microlens 400 may overlap the center C3 of the third opening OP3 in the top-view diagram. In accordance with some embodiments, in the normal direction 100N of the substrate 100, the microlens 400 may partially overlap the third light-shielding layer 300c. Furthermore, as shown in FIG. 1A, in accordance with some embodiments, adjacent microlenses 400 may be spaced apart by a distance; that is, the microlenses 400 may be disposed discontinuously. However, in accordance with some other embodiments, adjacent microlenses 400 may be connected; that is, the microlenses 400 may be disposed continuously.

The microlens 400 has a light-collecting effect. It is worth noting that the microlens 400 can be used to guide the light L0 into an optical channel formed by the first opening OP1, the second opening OP2 and the third opening OP3, so that the optical sensing element 200 has a maximum response value for the light L0 with an incident angle θ1 that is greater than or equal to 10 degrees and less than or equal to 30 degrees relative to the normal direction 100N of the substrate 100 (where the normal direction 100N corresponds to the position of the incident angle of 0 degrees). That is, for light of the same intensity, when the light enters the microlens 400 at the incident angle θ1 greater than or equal to 10 degrees and less than or equal to 30 degrees with respect to the normal direction 100N of the substrate 100, the response signal generated by the optical sensing element 200 according to the incident light is strong, and reaches a maximum value at a certain angle from 10 degrees to 30 degrees.

In accordance with the embodiments of the present disclosure, the optical sensing element 200, the light-shielding structure 300, and the microlens 400 are configured in a specific manner, so that the optical sensing element 200 has a large response value for incident light with a specific angle, and the incident light with this specific angle is the light L0 having the incident angle θ1 greater than or equal to 10 degrees and less than or equal to 30 degrees with respect to the normal direction 100N of the substrate 100 (10 degrees≤incident angle θ1≤30 degrees). In accordance with some embodiments, the incident angle θ1 may be 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees, 24 degrees, 25 degrees, 26 degrees, 27 degrees, 28 degrees, or 29 degrees, etc., but it is not limited thereto.

In particular, the optical sensing element 200, the light-shielding structure 300 and the microlens 400 configured in the aforementioned specific manner can reduce the influence of ambient light on the optical sensing element 200, and reduce the interference of ambient light on the signal interpretation of the electronic device 1, thereby improving the sensing performance of the electronic device 1.

In accordance with some embodiments, the material of the microlens 400 may include silicon oxide, polymethylmethacrylate (PMMA), cycloolefin polymer (COP), polycarbonate (PC), another suitable material or a combination thereof, but it is not limited thereto.

In accordance with some embodiments, the microlens 400 may be formed by a chemical vapor deposition process, a physical vapor deposition process, a coating process, a printing process, another suitable process, or a combination thereof. In addition, the microlens 400 may be patterned to have a suitable shape and profile by a photolithography process and/or an etching process.

Figure 1B:
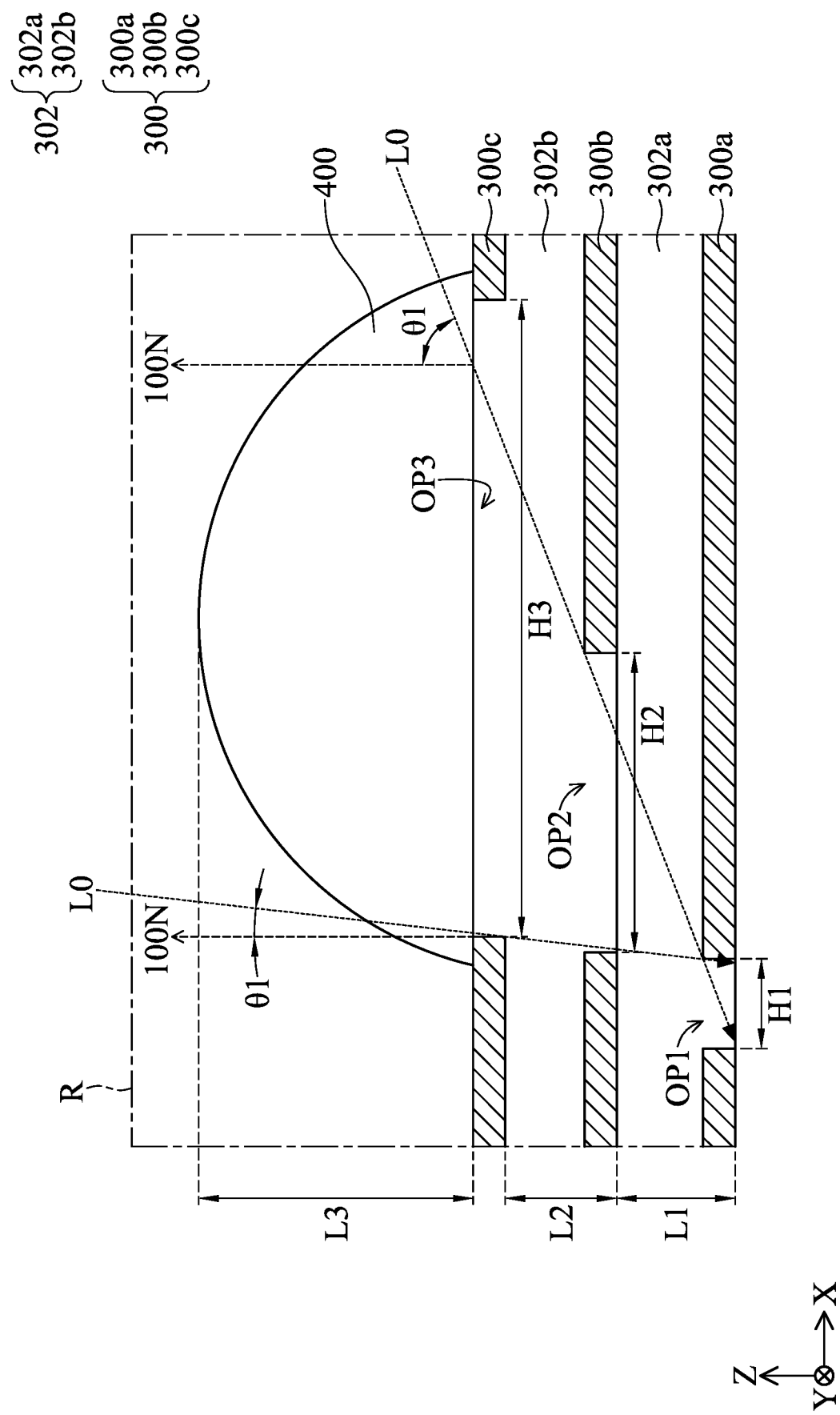
FIG. 1B is an enlarged structural diagram of the region R of FIG. 1A in accordance with some embodiments of the present disclosure.

Next, refer to FIG. 1B to further describe the structural features of the electronic device 1 (sensing structure 10). FIG. 1B is an enlarged structural diagram of the region R of FIG. 1A in accordance with some embodiments of the present disclosure.

As shown in FIG. 1B, in accordance with some embodiments, the size of the third opening OP3 may be larger than the size of the second opening OP2, and the size of the second opening OP2 may be larger than the size of the first opening OP1. In accordance with some embodiments, the first opening OP1 may have a diameter (width) H1, and the diameter H1 may be greater than or equal to 2 micrometers and less than or equal to 6 micrometers (2 micrometers≤diameter H1≤6 micrometers), for example, 3 micrometers, 4 micrometers, or 5 micrometers, but it is not limited thereto. In accordance with some embodiments, the second opening OP2 may have a diameter (width) H2, and the diameter H2 may be greater than or equal to 5 micrometers and less than or equal to 10 micrometers (5 micrometers≤diameter H2≤10 micrometers), for example, 6 micrometers, 7 micrometers, 8 micrometers, or 9 micrometers, but it is not limited thereto. In accordance with some embodiments, the third opening OP3 may have a diameter (width) H3, and the diameter H3 may be greater than or equal to 8 micrometers and less than or equal to 18 micrometers (8 micrometers≤diameter H3≤18 micrometers), for example, 9 micrometers, 10 micrometers, 11 micrometers, 12 micrometers, 13 micrometers, 14 micrometers, 15 micrometers, 16 micrometers or 17 micrometers, but it is not limited thereto.

Furthermore, the aforementioned diameter H1 of the first opening OP1 refers to the diameter of the bottom of the first opening OP1 in the top-view diagram (e.g., the X-Y plane in the drawing) of the electronic device 1. The aforementioned diameter H2 of the second opening OP2 refers to the diameter of the bottom of the second opening OP2 in the top-view diagram (e.g., the X-Y plane in the drawing) of the electronic device 1. Furthermore, the aforementioned diameter H3 of the third opening OP3 refers to the diameter of the bottom of the third opening OP3 in the top-view diagram (e.g., the X-Y plane in the drawing) of the electronic device 1. It should be noted that, when observing the cross-sectional view of the embodiments of the present disclosure, if the cross-sectional line does not pass through the center points of the openings OP1 to OP3 (center C1 to center C3 in FIG. 1A), the width of the opening measured in the cross-sectional view will be smaller than the diameter of the opening. For example, when the diameter H3 of the third opening OP3 is 18 micrometers, the width of the third opening OP3 measured in the cross-sectional view may be less than or equal to 18 micrometers. Similarly, the width of the second opening OP2 measured in the cross-sectional view may be less than or equal to 10 micrometers, and the width of the first opening OP1 measured in the cross-sectional view may be less than or equal to 6 micrometers.

In addition, in accordance with some embodiments, the first dielectric layer 302a and the second light-shielding layer 300b disposed above the first light-shielding layer 300a may have a thickness L1, and the thickness L1 may be greater than or equal to 5 micrometers and less than or equal to 15 micrometers (5 micrometers≤thickness L1≤15 micrometers), for example, 6 micrometers, 7 micrometers, 8 micrometers, 9 micrometers, 10 micrometers, 11 micrometers, 12 micrometers, 13 micrometers or 14 micrometers, but it is not limited thereto. In accordance with some embodiments, the second dielectric layer 302b and the third light-shielding layer 300c disposed above the second light-shielding layer 300b may have a thickness L2, and the thickness L2 may be greater than or equal to 5 micrometers and less than or equal to 15 micrometers (5 micrometers≤thickness L2≤15 micrometers), for example, 6 micrometers, 7 micrometers, 8 micrometers, 9 micrometers, 10 micrometers, 11 micrometers, 12 micrometers, 13 micrometers or 14 micrometers, but it is not limited thereto.

The aforementioned thickness L1 refers to the distance between the lowest point of the first dielectric layer 302a (e.g., the lowermost edge of the portion filled in the first opening OP1) and the lower surface of the second light-shielding layer 300b in the normal direction 100N of the substrate 100 (for example, the Z direction in the drawing). The aforementioned thickness L2 refers to the distance between the lowest point of the second dielectric layer 302b (e.g., the lowermost edge of the portion filled in the second opening OP2) and the lower surface of the third light-shielding layer 300c in the normal direction 100N of the substrate 100.

In accordance with some embodiments, the microlens 400 may have a thickness L3, and the thickness L3 may be greater than or equal to 2.5 micrometers and less than or equal to 10 micrometers (2.5 micrometers≤thickness L3≤10 micrometers), for example, 3 micrometers, 6 micrometers, or 9 micrometers, but it is not limited thereto.

The aforementioned thickness L3 refers to the maximum thickness of the microlens 400 in the normal direction 100N of the substrate 100. That is, the distance from the bottom of the microlens 400 to the vertex of the microlens 400.

In addition, referring to FIG. 1B, as mentioned above, the microlens 400 can be used to guide the light L0 into the optical channel formed by the first opening OP1, the second opening OP2 and the third opening OP3, so that the optical sensing element 200 has the maximum response value for the light L0 incident on the microlens 400 with the incident angle θ1 greater than or equal to 10 degrees and less than or equal to 30 degrees with respect to the normal direction 100N.

Figure 2:
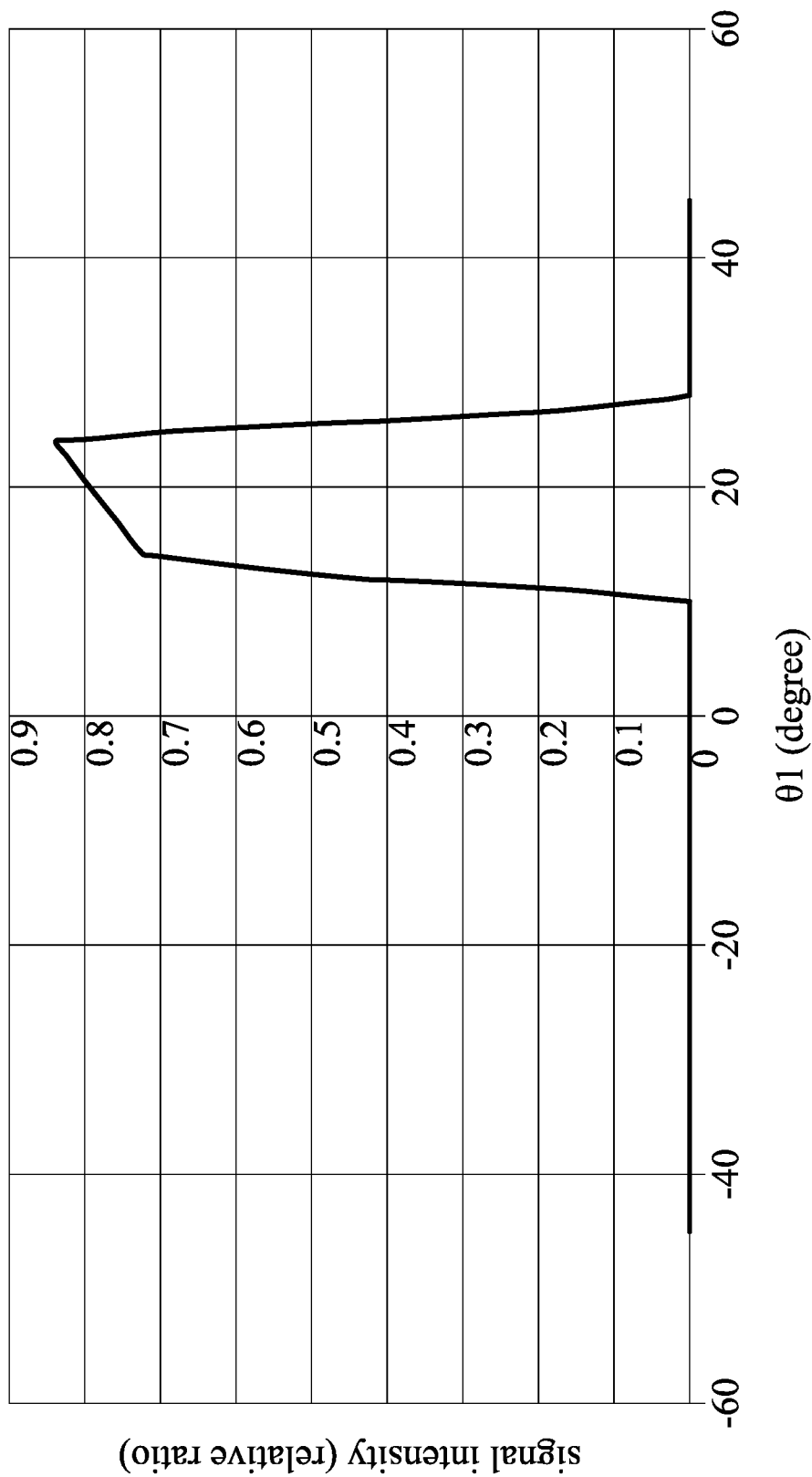
FIG. 2 is a simulation result of the relationship between the incident angle of the light received by the electronic device and the signal intensity in accordance with some embodiments of the present disclosure.

Refer to FIG. 2, which is a simulation result of the relationship between the incident angle θ1 of the light received by the optical sensing element 200 of the electronic device 1 and the signal intensity (the relative ratio of the signal generated by the light incident on the optical sensing element 200 to the signal generated by the light incident on the electronic device 1) in accordance with some embodiments of the present disclosure.

As shown in FIG. 2, in the electronic device 1 having the aforementioned structure, the optical sensing element 200 has relatively high signal intensity for the range of the incident angle θ1 greater than or equal to 10 degrees and less than or equal to 30 degrees relative to the normal direction, and the maximum response value occurs between 20 degrees and 30 degrees. The relative signal intensity of other angle ranges is almost zero. It can be seen that, in accordance with some embodiments, the light-shielding structure 300 and the microlens 400 are configured in such a way that the field of view of the optical sensing element 200 is greater than or equal to 10 degrees and less than or equal to 30 degrees (10 degrees≤field of view≤30 degrees). The field of view refers to the angle range corresponding to the full width at half maximum (FWHM) value of the signal peak in the curve of the signal value versus the incident angle θ1.

Generally speaking, in a situation where a user uses the electronic device 1, the angle presented by the ambient light (e.g., sunlight) and the electronic device 1 is mainly determined by the relative position between the user and the light source of the ambient light. For example, when the user places the electronic device 1 on a horizontal surface for operation, the incident angle of ambient light (e.g., sunlight at noon, indoor fluorescent lamps, etc.) with respect to the normal direction of the electronic device 1 (e.g., the normal direction 100N of the substrate 100) is about 0 degrees; when the user operates the electronic device 1 by hand, the incident angle of ambient light (for example, sunlight at noon, indoor fluorescent lamps, etc.) with respect to the normal direction of the electronic device 1 (e.g., the normal direction 100N of the substrate 100) is about 45 degrees.

It should be noted that, in accordance with the embodiments of the present disclosure, the structural of the electronic device 1 is mainly designed such that the light with the incident angle θ1 greater than or equal to 10 degrees and less than or equal to 30 degrees with respect to the normal direction 100N of the substrate 100 can pass through the light-shielding structure 300 to the optical sensing element 200. Therefore, when the incident angle of ambient light (e.g., sunlight) with respect to the normal direction of the electronic device 1 is about 0 degrees and 45 degrees, more than 50% of the ambient light will be blocked by the light-shielding structure 300 after being refracted, and the ambient light actually incident on the optical sensing element 200 is less than 50%. Therefore, the structural design according to the embodiments of the present disclosure can reduce the adverse effect of ambient light on the sensing performance (e.g., fingerprint identification function) of the electronic device 1.

Figure 3B:
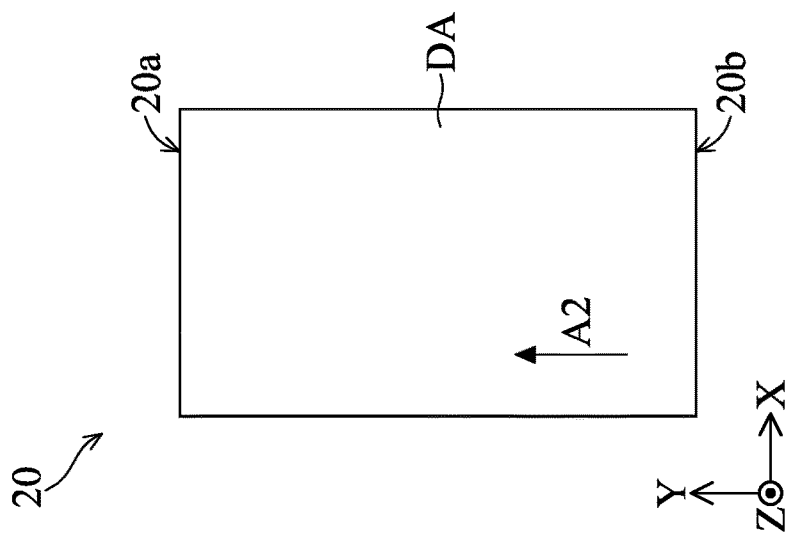
FIG. 3B is a top-view diagram of some elements of an electronic device in accordance with some embodiments of the present disclosure.
Figure 3A:
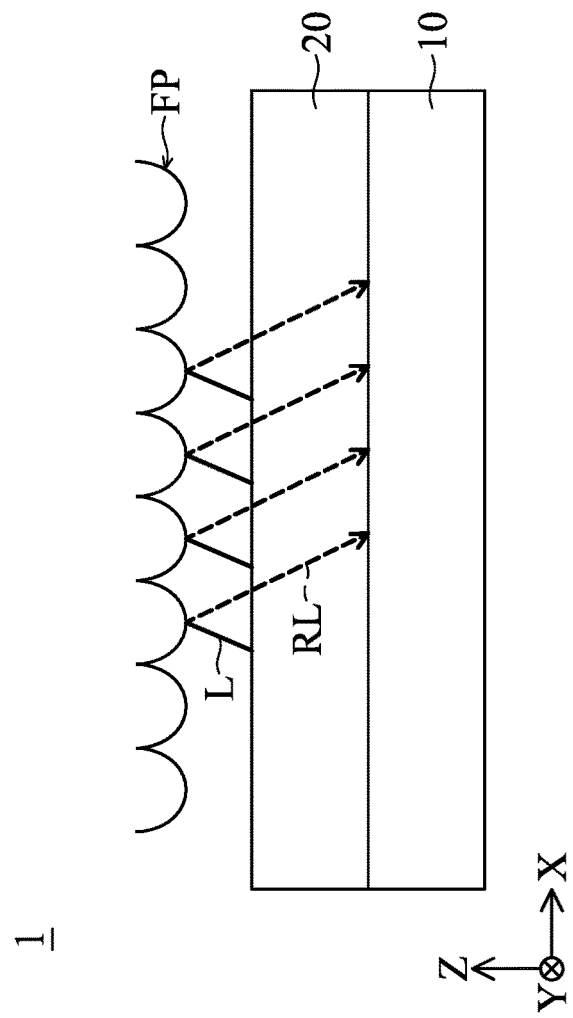
FIG. 3A is a structural diagram of an electronic device in accordance with some embodiments of the present disclosure.

Next, refer to FIG. 3A and FIG. 3B. FIG. 3A is a structural diagram of the electronic device 1 in accordance with some embodiments of the present disclosure. FIG. 3B is a top-view diagram of the display panel 20 of the electronic device 1 in accordance with some embodiments of the present disclosure. It should be understood that, some elements of the electronic device 1 are omitted in the figures for clarity, and only some elements are schematically shown. In accordance with some embodiments, additional features may be added to the electronic device 1 described below.

The electronic device 1 may include the aforementioned sensing structure 10 and the display panel 20. The display panel 20 may be disposed above the sensing structure 10. For example, the display panel 20 may be disposed on the microlens 400 (as shown in FIG. 1A). In accordance with some embodiments, the electronic device 1 may have functions such as touch-sensing or fingerprint recognition. For example, the electronic device 1 may be a touch display device, but it is not limited thereto. As shown in FIG. 3A, the light L generated by the display panel 20 may be reflected by a finger FP to generate reflected light RL, and the reflected light RL (for example, the light L0 shown in FIG. 1A) may be transmitted to the optical sensing element 200 through the gap of the display panel 20 of the sensing structure 10. The optical sensing element 200 can sense the touch of the finger FP and convert it into an electrical signal for identification and analysis by the corresponding driving element or signal processing element. In accordance with some embodiments, the display panel 20 may be fixed on the sensing structure 10 by an adhesive layer (not illustrated). In accordance with some embodiments, the adhesive layer may include a light-curable adhesive material, a heat-curable adhesive material, a light-heat-curable adhesive material, another suitable material, or a combination thereof, but it is not limited thereto. For example, in accordance with some embodiments, the adhesive layer may include, but is not limited to, optical clear adhesive (OCA), optical clear resin (OCR), pressure sensitive adhesive (PSA), another suitable material, or a combination thereof.

In accordance with some embodiments, the display panel 20 may include, for example, a liquid-crystal display panel, a light-emitting diode display panel, such as an organic light-emitting diode (OLED) display panel, a mini light-emitting diode (mini LED) display panel, a micro light-emitting diode (micro LED) display panel, or a quantum dot (QD) light-emitting diode (QLED or QDLED) display panel, but it is not limited thereto.

In addition, as shown in FIG. 3B, in accordance with some embodiments, the display panel 20 may have a display area DA and a non-display area (not illustrated). A second direction A2 is defined as the direction of a lower side 20b of the display area DA toward an upper side 20a of the display area DA. The lower side 20b and the upper side 20a of the display area DA are defined by the situation wherein the user normally uses the electronic device 1. For example, during use, the lower side 20b is defined as the side of the display area DA that is closer to the user, and the upper side 20a is defined as the side that is farther away from the user.

Figure 4:
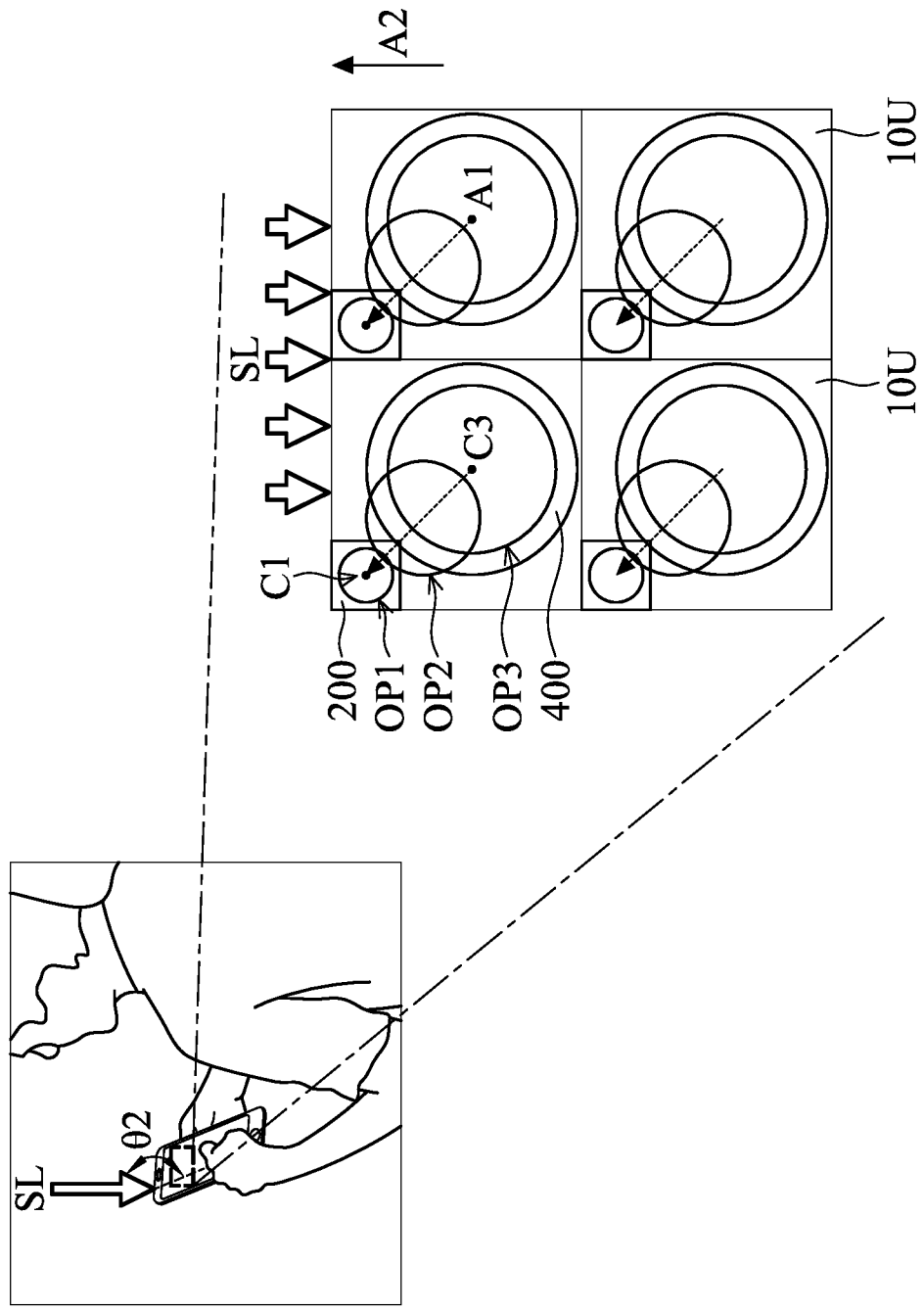
FIG. 4 is a structural diagram of an electronic device in a usage scenario in accordance with some embodiments of the present disclosure.
Figure 5:
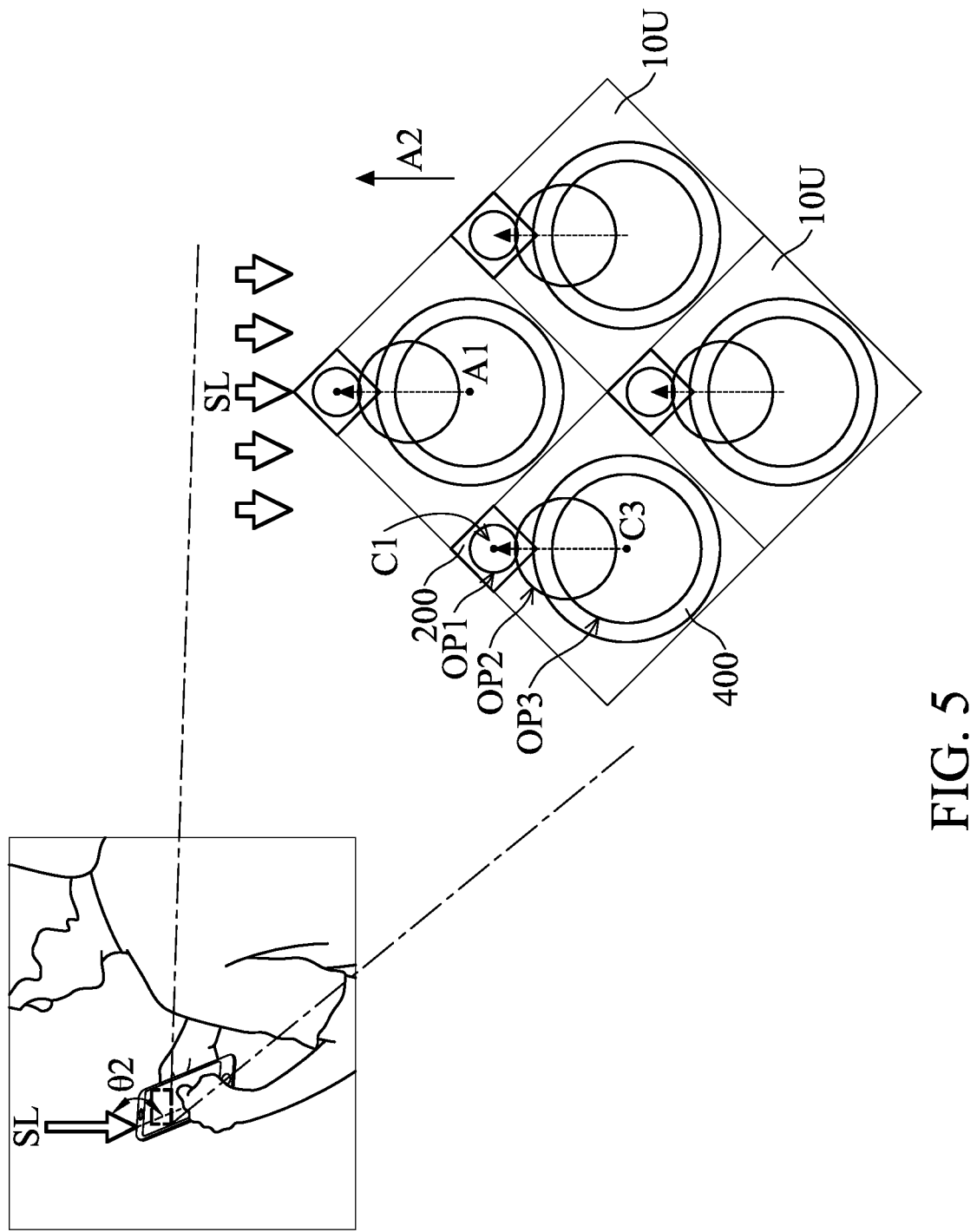
FIG. 5 is a structural diagram of an electronic device in a usage scenario in accordance with some embodiments of the present disclosure.

Refer to FIG. 4 and FIG. 5. FIG. 4 and FIG. 5 are structural diagrams of the electronic device 1 in a usage scenario in accordance with some embodiments of the present disclosure. In accordance with some embodiments, in the top-view diagram of the display panel 20 (e.g., the X-Y plane in the drawing), the second direction A2 may be different from the aforementioned first direction A1 in which the center C1 of the first opening OP1, the center C2 of the second opening OP2, and the center C3 of the third opening OP3 are arranged, but it is not limited thereto. Furthermore, the first direction A1 can be defined as a direction in which the optical sensing element 200 can absorb light. In accordance with some embodiments, in the top-view diagram of the display panel 20, the included angle formed between the first direction A1 and the second direction A2 may be greater than 0 degrees and less than 180 degrees (0 degrees<included angle<180 degrees). In accordance with some embodiments, in the top-view diagram of the display panel 20, the first direction A1 forms an acute angle with respect to the second direction A2.

It is worth noting that when the optical sensing element 200 is configured (through the configuration of microlens 400 and the light-shielding structure 300 etc.) such that the direction (the first direction A1) in which the optical sensing element 200 absorbs light is different from or opposite to the second direction A2, the interference to the optical sensing element 200 caused by excessive ambient light can be reduced. Please refer to FIG. 4 and FIG. 5 for details.

In FIG. 4 and FIG. 5, the enlarged areas show the positional relationship of the optical sensing element 200, the microlens 400 and the first opening OP1, the second opening OP2 and the third opening OP3 of the light-shielding structure 300 of the electronic device 1 in the top-view diagram.

As shown in FIG. 4 and FIG. 5, in general, when the user operates the electronic device 1 (taking a mobile phone as an example), the user is accustomed to turn the side with the earpiece (the upper side 20a) upward, and the side with the microphone (the lower side 20b) downward. As mentioned above, the direction of the lower side 20b toward the upper side 20a may define the second direction A2. In accordance with some embodiments, in the sensing units 10U of the electronic device 1, the first opening OP1, the second opening OP2 and the third opening OP3 may be arranged along the first direction A1 and separated from each other, and the first direction A1 may define the direction in which the optical sensing element 200 can absorb light. In accordance with some embodiments, the first direction A1 may be a line connecting the center C1 of the first opening OP1 and the center C3 of the third opening OP3.

In accordance with some embodiments, through the configuration of the microlens 400 and the light-shielding structure 300, the direction (the first direction A1) of the optical sensing element 200 that can absorb light is different from the second direction A2, and an angle is formed between the first direction A1 and the second direction A2. More specifically, viewed from a top view, the included angle formed between the first direction A1 and the second direction A2 may be greater than 0 degrees and less than 180 degrees (0 degrees<included angle<180 degrees) through different configurations of the microlens 400 and the light-shielding structure 300.

Furthermore, when used under the sunlight SL, the incident angle θ2 (azimuth angle) of the sunlight SL irradiating the electronic device 1 is also different from the aforementioned first direction A1. In accordance with some embodiments, the angle formed between the incident angle θ2 of the sunlight SL irradiating the electronic device 1 and the first direction A1 may be greater than 0 degrees and less than 180 degrees.

To summarize the above, in accordance with the embodiments of the present disclosure, the electronic device includes the optical sensing element, light-shielding structure, and microlens configured in a specific manner, so that the optical sensing element has a maximum response value for oblique incident light, thereby reducing the interference of ambient light on the signal interpretation of the electronic device. Therefore, the sensing performance of the electronic device can be improved. For example, when the electronic device is used under sunlight, the adverse effects of image signal overexposure and reduced sensing sensitivity caused by the electronic device receiving a large amount of ambient light can be reduced.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Thus, the appended claims are intended to include within their scope such processes, machines, manufacture, compositions of matter, means, methods or steps. Moreover, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
a substrate having a normal direction;
an optical sensing element disposed on the substrate;
a light-shielding structure disposed on the optical sensing element, comprising:
a first light-shielding layer;
a second light-shielding layer disposed on the first light-shielding layer; and
a third light-shielding layer disposed on the second light-shielding layer,
wherein the first light-shielding layer comprises a first opening, the second light-shielding layer comprises a second opening, the third light-shielding layer comprises a third opening, and in a top-view diagram, centers of the first opening, the second opening and the third opening are separated from each other along a first direction, and the first direction is a line connecting a center of the first opening and a center of the third opening; and
a microlens disposed on the plurality of light-shielding layers and overlapping the opening of the uppermost light-shielding layer;
wherein the microlens guides light into an optical channel formed by the plurality of openings, so that the optical sensing element has a maximum response value for light with an incident angle that is greater than or equal to 10 degrees and less than or equal to 30 degrees relative to the normal direction.

2. The electronic device as claimed in claim 1, wherein the light-shielding structure and the microlens are configured such that a field of view of the optical sensing element is greater than or equal to 10 degrees and less than or equal to 30 degrees.

3. The electronic device as claimed in claim 1, wherein the center of the first opening and the center of the third opening are separated from each other by a distance, and the distance is greater than or equal to 4 micrometers and less than or equal to 8 micrometers.

4. The electronic device as claimed in claim 1, wherein the center of the second opening and the center of the third opening are separated from each other by a distance, and the distance is greater than 0 micrometers and less than or equal to 6 micrometers.

5. The electronic device as claimed in claim 1, wherein a width of the first opening is less than or equal to 6 micrometers.

6. The electronic device as claimed in claim 1, wherein a width of the second opening is less than or equal to 10 micrometers.

7. The electronic device as claimed in claim 1, wherein a width of the third opening is less than or equal to 18 micrometers.

8. The electronic device as claimed in claim 1, wherein a size of the third opening is larger than a size of the second opening, and the size of the second opening is larger than a size of the first opening.

9. The electronic device as claimed in claim 1, wherein the first opening does not overlap the second opening in the normal direction.

10. The electronic device as claimed in claim 1, wherein the first opening does not overlap the third opening in the normal direction.

11. The electronic device as claimed in claim 1, wherein in a top-view diagram of the electronic device, a geometric center of the microlens overlaps a center of the third opening.

12. The electronic device as claimed in claim 1, further comprising a dielectric structure disposed on the optical sensing element.

13. The electronic device as claimed in claim 12, wherein the dielectric structure further comprises a first dielectric layer and a second dielectric layer, wherein the first dielectric layer is disposed between the first light-shielding layer and the second light-shielding layer, and the second dielectric layer is disposed between the second light-shielding layer and the third light-shielding layer.

14. The electronic device as claimed in claim 13, wherein the first dielectric layer and the second light-shielding layer have a thickness, and the thickness is greater than or equal to 5 micrometers and less than or equal to 15 micrometers.

15. The electronic device as claimed in claim 13, wherein the second dielectric layer and the third light-shielding layer have a thickness, and the thickness is greater than or equal to 5 micrometers and less than or equal to 15 micrometers.

16. The electronic device as claimed in claim 1, further comprising a display panel disposed on the microlens, wherein the display panel has a display area, and a second direction is defined as the direction from a lower side of the display area to an upper side of the display area, and wherein in a top-view diagram of the display panel, an included angle between the first direction and the second direction is greater than 0 degrees and less than 180 degrees.

17. The electronic device as claimed in claim 16, wherein in the top-view diagram of the display panel, the first direction forms an acute angle with respect to the second direction.

18. The electronic device as claimed in claim 1, wherein the first direction is a direction in which the optical sensing element absorbs light.

* * * * *